United States Patent [19]

Giessner et al.

[11] 4,173,690

[45] Nov. 6, 1979

[54] METHOD OF PRODUCING ELECTRICAL INSULATION FOAM

[75] Inventors: Bernard G. Giessner, Sicklerville, N.J.; David H. Reighter, Roslyn, Pa.; Allen E. Stringfellow, Haddonfield, N.J.

[73] Assignee: Gould Inc., Rolling Meadows, Ill.

[21] Appl. No.: 856,637

[22] Filed: Dec. 2, 1977

[51] Int. Cl.$^2$ ............................................. C08J 9/22
[52] U.S. Cl. ........................................ 521/89; 55/146; 55/157; 521/54; 521/55; 521/91; 521/122; 521/908
[58] Field of Search ....................................... 260/2.5 B

[56] References Cited

U.S. PATENT DOCUMENTS

| | | | |
|---|---|---|---|
| 2,945,828 | 7/1960 | Henning | 260/2.5 E |
| 3,198,859 | 8/1965 | Tomlinson | 260/2.5 E |
| 3,305,656 | 2/1967 | Devins | 55/75 |
| 3,876,566 | 4/1975 | Koshak et al. | 260/2.5 E |
| 3,965,053 | 6/1976 | Kleiner et al. | 260/2.5 HA |

FOREIGN PATENT DOCUMENTS 880377 9/1971 Canada .................................. 260/2.5 B

OTHER PUBLICATIONS

"Polyethylene" by Renfrew et al., pub. 157, pp. 409-417.

*Primary Examiner*—Morton Foelak
*Attorney, Agent, or Firm*—Ostrolenk, Faber, Gerb & Soffen

[57] ABSTRACT

An electrical insulation foamed plastic is produced using sulfur hexafluoride adsorbed on molecular sieves as the foaming agent and a low shear mixing technique.

5 Claims, No Drawings

METHOD OF PRODUCING ELECTRICAL INSULATION FOAM

BACKGROUND OF THE INVENTION

The preparation of electrical insulation plastic foams using sulfur hexafluoride adsorbed on molecular sieves is described in Canadian Pat. No. 880,377. The method therein described involves mixing of a hardenable plastic forming material and a molecular sieve having sulfur hexafluoride adsorbed therein, followed by heating the mixture to a temperature sufficient to cause the hardenable plastic forming material to harden to a solid plastic and to cause the sulfur hexafluoride to desorb from the molecular sieve to form a cellular structure in the solid plastic. In order to obtain a foam having a substantially uniform cellular structure and a void-free surface or skin, it was necessary to prepare the sieve-plastic mixture by the use of high shear mixing conditions. The use of low shear mixing or less intensive mixing conditions resulted in an inadequate distribution of the sieve within the plastic material which, in turn, resulted in a non-uniform cellular structure and large surface bubbles when the plastic sieve mixture was heated to form the foamed material.

The high shear mixing technique generates a substantial amount of heat causing the sulfur hexafluoride to desorb the sieve prematurely. It is therefore necessary to either very carefully effect the mixing or to provide cooling to the materials as they are being mixed. Even with careful attention to the mixing procedure, some premature desorption and blowing of the foam occurs and the resulting material often has poor surface characteristics caused by large surface bubbles.

Accordingly, it is the object of this invention to provide a new method by which an electrical insulation foam can be prepared from a hardenable plastic forming material and a molecular sieve having sulfur hexafluoride adsorbed therein which overcomes the foregoing problems. This and other objects of the invention will become apparent to those skilled in the art from the following detailed disclosure.

SUMMARY OF THE INVENTION

This invention relates to a method of producing an electrical insulation foam by mixing a hardenable plastic forming material with a molecular sieve having sulfur hexafluoride adsorbed therein followed by heating the mixture to cause the plastic material to harden and the sulfur hexafluoride to desorb from the sieve, and more particularly concerns a new method in which the sieve is first mixed with a portion of the plastic forming material sufficient to wet the sieve under low shear mixing conditions and then the resulting wet sieve is mixed with the remaining plastic forming material also under low shear mixing conditions.

DESCRIPTION OF THE INVENTION

The molecular sieves and plastic forming materials employed in the instant invention are the same as described in the aforementioned Canadian Pat. No. 880,377, which is hereby incorporated by reference. The molecular sieves used in the present invention are the well-known crystalline zeolitic metal aluminosilicates. Included are naturally occurring materials such as erionite, faujasite, mordenite and various synthetic molecular sieves. The sieve should have a pore size of sufficient dimension to adsorb sulfur hexafluoride, i.e., a pore size of at least about 10 Angstroms.

A wide variety of plastics can be employed, such as, for example, expoxies, urethanes, polyesters, silicones, polyvinyl chloride resins, phenolic resins, polyolefins, polystyrene, and many other types of known plastics. The epoxy resins are preferred.

The epoxy resins are well-known in the art. They include the cycloaliphatic polyepoxides, such as 3,4-epoxycyclohexylmethyl 3,4-epoxycyclohexanecarboxylate, bis(3,4-epoxy-6-methylcyclohexylmethyl) adipate, the polyol poly(epoxycyclohexanecarboxylates) such as ethylene glycol bis(3,4-epoxy-6-methylcyclohexanecarboxylate), the halogenated cycloaliphatic polyepoxides such as (1-bromo-3,4-epoxycyclohexyl)-methyl 1-bromo-3,4-epoxycyclohexanecarboxylate, vinyl cyclohexene dioxide, bis(2,3-epoxycyclopentyl) ether, the diglycidyl diether 2,2-bis(p-hydroxyphenyl)-propane, the diglycidyl diether of bis(p-hydroxyphenyl)methane, and the like. The polyepoxide can be hardened by using a catalyst such as a tertiary amine, a boron trifluoride complex, or the like, or by reacting with a hardener such a polycarboxylic acid or anhydride, an amine, or by using both a catalyst and a hardener.

The useful polyurethanes are of the well-known products of an organic polyisocyanate with a polyol. Typical polyisocyanates include 2,4- and 2,6-tolylene diisocyanate and mixtures thereof, bis(4-isocyanatophenyl)methane, xylylene diisocyanate, and the like. Polyols include hydroxyl-terminated polyesters and polyester-ethers, polyhydroxyalkanes and alkylene oxide adducts thereof, trialkanolamines and alkylene oxide adducts thereof, alcohols, non-reducing sugar and sugar derivatives and the alkylene oxide adducts thereof, alkylene oxide adducts of aromatic amine/-phenol/aldehyde ternary condensation products, alkylene oxide adducts of phosphorus and polyphosphorus acids, and various hydroxyl-terminaed phosphites and phosphonates, alkylene oxides of polyphenols, polytetramethylene glycols, functional glycerides, such as castor oil and the like.

When the hardenable plastic forming material is an epoxy or urethane, it is often desirable to employ a surfactant or emulsifying agent to regulate the cell size of the formed plastic. Thus, it is within the scope of the invention to employ a small amount, e.g., about 0.001% to 5.0% by weight of an emulsifying agent such as a polysiloxanepolyoxyalkylene block copolymer or the like.

The polyvinyl chloride resins employed in the present invention are preferably plastisol-grade resins which are suspensions of polyvinyl chloride resin powder in a plasticizer which is a poor solvent for the resin at low temperature but in which the polyvinyl chloride will dissolve at higher temperature.

The molecular sieves can be loaded with the sulfur hexafluoride by conventional procedures. One such procedure involves contacting the sieve with the sulfur hexafluoride in the absence of other materials such as water which would be preferentially adsorbed therein. The sieve can absorb up to about 30% by weight of sulfur hexafluoride and it is preferred that the sieve absorb at least about 20% by weight in order to provide enough gas to foam the plastic.

The hardenable plastic forming material-loaded molecular sieve mixture is prepared by first mixing the sieve with sufficient plastic forming material to wet the sieve. This can be achieved at room temperature or at slightly elevated temperature if the viscosity and/or solubility characteristics of the plastic forming reactants so require. Low shear mixing conditions are employed. By low sheer it is meant that the agitating members are rotating at a speed low enough so the stirring edge will not exceed a peripheral speed of 600 feet per minute. In general, the weight ratio of the loaded sieve to plastic forming material can vary from about 2:1 to about 1:2. A weight ratio of 1:1 usually assures that sieves are fully wet. The wet sieve can be effectively controlled from a heavy paste consistency into a viscosity of about 5000 centipoises. The paste is more desirable since it more adequately controls the diffusion of the sulfur hexafluoride gas. If desired, the wet sieve can be stored or, alternatively, the completion of the mixing can be accomplished promptly.

In the next step, the wet sieve is mixed with sufficient plastic forming material to form the final mixture which is to be foamed. This mixing is effected under the same conditions as just described with respect to the wet sieve and the weight ratio of the wet sieve to the addition resin can vary from about 1:1 to about 1:30 and is preferably about 1:2 to about 1:9. Thus, the sieve will constitute about 2–20 weight percent of the final sieve/plastic material mixture and preferably about 5 to 15 percent.

The loaded molecular sieve and hardenable plastic forming material mixture is subjected to sufficient heat to substantially simultaneously harden the plastic forming material to form a solid plastic and to cause the molecular sieve to release the sulfur hexafluoride to thereby foam the plastic as it forms. The temperature at which this takes place depends, to an extent, on the specific nature of the plastic employed and other factors such as the degree of foaming desired. In many cases, a temperature of at least 100° C., and preferably at least 121° C., up to about 150° C. is employed. The foaming time also depends, to an extent, on the same factors and, in general, is up to about 0.5 hour.

If desired, the mixture can be heated in a mold and after a brief molding period, the foamed and hardened plastic article can be subjected to a post-cure in an oven. Alternatively, an article can be coated with the mixture by dipping, spraying, brushing and the like and the coated article heated.

As one example of the instant invention, an electrical insulation foam was prepared as follows. Twenty parts of 3,4-epoxycyclohexylmethyl 3,4-epoxycyclohexanecarboxylate and 20 parts of a sulfur hexafluoride loaded molecular sieve were thoroughly hand mixed at about 25° C. The molecular sieve was Zeolite 13X which has a 10 Angstrom pore size, and was loaded with about 25 percent by weight of sulfur hexafluoride. Then a mixture containing 80 parts of 3,4-epoxycyclohexylmethyl 3,4-epoxycyclohexanecarboxylate, 80 parts of trimer acid, 75 parts of hydrate alumina, 0.4 part of a silicone surfactant, 11 parts of a liquid carboxylic anhydride and 4 parts of stannous oxalate were placed in a mixer along with the wet molecular sieve and then thoroughly mixed under low shear conditions for 2 minutes using a lightning mixer running at about 200 R.P.M.

The resulting mixture was poured into a mold which was placed in a 135° C. oven and maintained in the oven for 0.5 hour. The mixture was then demolded and placed in an oven for 16 hours at 120° C. for post-curing. A superior electrical insulation was obtained.

As another example of the instant invention, a 30 pound foam insulation part was prepared as follows. Forty parts of 3,4-epoxycyclohexylmethyl 3,4-epoxycyclohexane carboxylate and 20 parts of $SF_6$ loaded 13X molecular sieves were thoroughly hand mixed and then stored for 24 hours to assure complete wetting. Then 80 parts of 3,4-epoxycyclohexylmethyl 3,4-epoxycyclohexane carboxylate, 50 parts trimer acid, 50 parts of a liquid carboxylic anhydride, 250 parts of 325 mesh silica, 1 part silicone surfacant, and 5 parts stannous oxalate were thoroughly mixed and evacuated by standard methods. This thoroughly blended mixture was then added to the wet molecular sieves and gently mixed 10 minutes at 200 RPM on a lightning mixer.

The resulting mixture was placed in a feed tank and then pumped under positive pressure into an electrostatically heated tool maintained at 121° C. The casting was demolded in 30 minutes and then cured 16 hours at 121° C. A superior electrical insulation was obtained.

Various changes and modifications can be made in the process of the instant invention without departing from the spirit and scope thereof. The various embodiments disclosed herein were for the purpose of illustration only and were not intended to limit the invention.

What is claimed is:

1. In a method of producing an electrical insulator foam by mixing a hardenable plastic forming material with a molecular sieve having sulfur hexafluoride adsorbed therein and then subjecting the mixture to sufficient heat to cause the hardenable plastic forming material to harden and to cause the sulfur hexafluoride to desorb from the molecular sieve, the improvement which comprises forming said mixture by first mixing said sieve with a part of said plastic forming material sufficient to wet said sieve under low shear mixing conditions, the weight ratio of sieve to said part of said plastic forming material being about 2:1 to about 1:2, and then mixing said wet sieve with additional plastic forming material under low shear conditions, wherein said low shear mixing conditions are such that the mixing apparatus are rotating at a speed low enough so that the stirring edge will not exceed a peripheral speed of 600 feet per minute.

2. The method of claim 1 wherein said ratio is about 1:1.

3. The method of claim 1 wherein the weight ratio of said wet sieve to said additional plastic forming material is about 1:1 to about 1:30.

4. The method of claim 3 wherein said ratio of wet sieve to additional plastic forming material is about 1:2 to about 1:9.

5. The method of claim 3 wherein said ratio of wet sieve to additional plastic forming material is about 1:2 to about 1:9 and wherein said ratio of sieve to said part of said plastic forming material is about 1:1.

* * * * *